Patented Nov. 30, 1948

2,455,198

UNITED STATES PATENT OFFICE 2,455,198

PROCESS OF MAKING SHAPED ARTICLES

Gordon T. Vaala, Wilmington, Del., assignor to E. I. du Pont de Nemours & Company, Wilmington, Del., a corporation of Delaware No Drawing. Application June 5, 1943, Serial No. 439,805

6 Claims. (Cl. 154—102)

This invention relates to new, heat curable plastic compositions, and in particular to thermosetting polyvinyl acetal plastic compositions.

Synthetic resins, to be useful as coating compositions or for the formation of shaped articles, must be sufficiently soluble or thermoplastic to permit application or fabrication. However, it is generally undesirable for the resins to remain permanently soluble or thermoplastic after fabrication because they cannot then be used in articles which are exposed to high temperatures or which come in contact with solvents for the polymeric materials. In the manufacture of molded, calendered, or extruded articles, it is essential that the polymeric material become plastic and workable at some elevated temperature. However, if the material remains permanently thermoplastic it will again become soft, plastic, and subject to damage whenever it is heated to a temperature as high as or higher than the original forming temperature. Furthermore, if the polymeric material is soluble, as most thermoplastic resins are, it is not suitable for use where it will come in contact with solvents. For these reasons it is highly desirable to use heat curable resins which are initially sufficiently thermoplastic to permit forming but which become insoluble and non-thermoplastic when the final article is baked at an appropriate elevated temperature.

The number of polymeric materials which can be cured is unfortunately extremely limited. In the field of molded articles the thermosetting urea-formaldehyde and phenol - formaldehyde resins which are initially sufficiently plastic to permit molding but become insoluble and non-thermoplastic during molding are greatly preferred over non-thermosetting resins for the preparation of articles which must withstand high temperatures or contact with solvents. However these resins cannot be pliabilized sufficiently with plasticizers to make them suitable for flexible articles. Even as molding compositions, their brittleness, opacity, and in some cases their color, are serious disadvantages. Rubber and synthetic rubbers have been the principal materials used where flexible articles or coatings capable of being cured by heat have been required. The great advantage of rubber for many uses is that it can be compounded with the materials required for vulcanization and subsequently milled, calendered, extruded, or otherwise formed without premature curing of the composition during these operations. The rubber article or coating can then be cured with heat to render it insoluble and non-thermoplastic. In many respects, however, rubber is inferior to thermoplastic resins. It has poor age resistance, especially at high temperatures and in the presence of ozone and sunlight. Pigmented rubber compositions show poor resistance to crocking which is the tendency for the pigment to be rubbed off the surface. Furthermore, rubber is badly swollen by oils, greases and hydrocarbon solvents. Its color makes it unsuitable for use in transparent and brightly colored objects.

In many respects the acetals of polyvinyl alcohol are superior to any of the known thermosetting resins. They are easily plasticized to yield compositions varying widely in pliability. Their clarity permits their use in articles which are transparent or opaque and which are either colorless or colored. Furthermore, these polyvinyl acetal resins are superior to rubber in their resistance to aging and crocking and are not affected by oils, greases, or hydrocarbon solvents. Methods have been proposed for curing synthetic polymeric materials which contain functional groups such as hydroxyl, amino, carboxyl, and amide groups. This is accomplished by reacting the polymeric materials with an agent which is capable of reacting with two or more of the reactive groups present in the polymer. For example, diisocyanates such as hexamethylene diisocyanate have been proposed for curing polymeric materials containing hydroxyl groups. Due to the extreme reactivity of the diisocyanate, curing occurs at room temperature and very rapidly at slightly elevated temperatures. Other agents which have been proposed for insolubilizing or reducing the thermoplasticity of polymeric materials containing hydroxyl groups are formaldehyde, dichlorodioxane, and acid chlorides or anhydrides of dibasic acids. Although these agents have increased somewhat the utility of certain polymeric materials containing hydroxyl groups, they are of very limited use with polyvinyl acetals. Certain agents such as the chlorides and anhydrides of dibasic acids and dichlorodioxane which are acidic or liberate acidic materials cause degradation of the polyvinyl acetal. Certain other agents such as hexamethylene diisocyanate, for example, react so rapidly that plastic compositions containing them cannot be subjected to usual forming operations such as milling, calendering, extruding, or molding without premature curing during these operations. Neither are the very reactive agents such as the diisocyanates suitable for use in solutions of polyvinyl acetals since they react even at room temperature, causing the solution to gel upon standing. Furthermore, many of the more active materials which have been proposed as curing agents, such as the diisocyanates and the acid chlorides of dibasic acids, react with and are destroyed by extremely small amounts of moisture. This makes it necessary to maintain essentially anhydrous conditions whenever these materials are employed.

The primary object of this invention is to provide improved thermosetting polyvinyl acetal plastic compositions which can be formed into shaped articles by calendering, extruding, molding, or by spinning or casting from solution and which can subsequently be rendered non-thermoplastic and insoluble by a baking treatment.

These objects are accomplished by intimately mixing dimethylol urea or an ether of dimethylol urea with a polyvinyl acetal resin having a hydroxyl number of at least 60, forming the mixture by calendering, extruding, molding, casting, or by spinning from solution, and subsequently heating the formed article to render it insoluble and non-thermoplastic.

It has been found that compositions comprising a thermoplastic polyvinyl acetal and a smaller amount of dimethylol urea or an alkyl ether of dimethylol urea can be formed into shaped articles by calendering, extruding, molding, or casting from solution. The products, like untreated polyvinyl acetal compositions, are readily soluble and thermoplastic. However, if the shaped article is then cured by baking for two hours at about 120° C. or at a higher temperature for a shorter time, the polyvinyl acetal resin becomes insoluble and non-thermoplastic.

The polyvinyl acetal resins suitable for use are the acetals of hydrolyzed (or partially hydrolyzed) polyvinyl esters. Although these resins may differ in the aldehyde used, the degree of hydrolysis of the polyvinyl ester, and the degree of acetalization, they are suitable for use in this invention, provided they have hydroxyl numbers of at least 60. Since the rate of curing increases with increasing hydroxyl number, a low hydroxyl polyvinyl acetal is used when a slow rate of curing is desired, and a high hydroxyl polyvinyl acetal is used to prepare compositions which must cure more rapidly or at slightly lower temperatures. Polyvinyl acetals having hydroxyl numbers below 200 are preferred for calendering or extruding since they do not cure too rapidly to be formed by these methods.

Hydroxyl number is defined as the number of milligrams of potassium hydroxide required to saponify the ester groups produced by completely esterifying one gram of the polymeric material. Hydroxyl number can be determined directly by esterifying a weighed amount of polymer and determining the amount of potassium hydroxide required to saponify the product but, since the original polymer may also contain saponifiable groups, this value must be corrected by subtracting the saponification number of the original polymer. It is usually more convenient to determine the hydroxyl number by the method of Smith and Bryant (Jour. Am. Chem. Soc. 57, 61 (1935)). In this method a weighed sample of material is acetylated with acetyl chloride and the amount of acetyl chloride consumed is determined by titration.

Dimethylol urea and ethers of dimethylol urea which are suitable are those having the formula $ROCH_2NHCONHCH_2OR$ where R is hydrogen or a lower alkyl group having less than about 8 carbon atoms. The alkyl groups may be substituted with an aryl radical as in the benzyl groups, $C_6H_5CH_2-$. Dimethylol urea may be prepared by condensing one mole of urea with two moles of formaldehyde in the presence of alkaline reagents. The ethers of dimethylol urea may be prepared from dimethylol urea and an alcohol by the method of Conaway U. S. 2,254,001 or Kadowaki, Bull. Chem. Soc. Japan 11, 248–261 (1936). Dimethylol urea is a more active curing agent than the ethers of dimethylol urea. It is most useful in compositions which are formed at low temperatures or by casting from solution and are subsequently to be cured at low temperatures. The ethers of dimethylol urea require higher temperatures for curing and consequently are most useful in compositions which are to be formed at relatively high temperatures by calendering or extruding and which must not cure prematurely during these operations. Since dimethylol urea is less soluble in polyvinyl acetals than the ethers of dimethylol urea, it should be very finely powdered before incorporation in the composition.

The invention is illustrated by the following examples. All parts are by weight.

Example I

A coating composition is prepared from the following ingredients as is described below:

| | Parts |
|---|---|
| Polyvinyl butyral (hydroxyl No. 160) | 100 |
| Castor oil | 28.5 |
| Hydrogenated castor oil | 14.3 |
| Finely ground dimethylol urea | 9.9 |
| Beta-phenyl-beta-bromopropionic acid | 4.0 |
| Whiting | 54.7 |

The polyvinyl butyral, castor oil, and hydrogenated castor oil are swollen with 200 parts of acetone and the resulting mixture is milled on a warm rubber mill until it is free of solvent. The other ingredients are then milled into the composition. This composition is calendered into unsupported plastic sheeting between rolls heated at about 60° C. The sheeting is cured by baking for two hours at 117° C. The mar point, which is the minimum temperature at which the film is permanently deformed by a standard stress, is 170° C. The cured sheeting is unaffected by boiling water and retains the pliability of the uncured sheeting. Another sample of sheeting which is prepared in the same way except that the dimethylol urea is omitted becomes soft and sticky and loses its shape when placed in boiling water. It mars at 60° C. in the mar point test.

Example II

A coating composition is prepared from the following materials, as is described below:

| | Parts |
|---|---|
| Polyvinyl butyral (hydroxyl No. 144) | 100 |
| Di-(butoxyethyl) sebacate | 40 |
| Dibutylammonium oleate | 5 |
| Crown clay | 75 |
| Carbon black | 1 |
| Di-(butoxymethyl) urea | 15 |

The polyvinyl butyral, di-(butoxyethyl) sebacate, and dibutylammonium oleate are mixed together with 100 parts of denatured alcohol and allowed to stand for two hours. The mixture is then milled on a warm rubber mill (roll temperature 40–60° C.) until homogeneous and free of solvent. The Crown clay, carbon black, and di-(butoxymethyl) urea are each in turn milled into the composition. This composition is calendered into unsupported plastic sheeting between rolls heated at about 60° C. The sheeting is cured in an oven for two hours at 120° C. The sheeting thus obtained was not softened by boiling water nor damaged by folding against itself at temperatures as high as 200° C.

*Example III*

A coating composition is prepared from the following materials as is described below:

| | Parts |
|---|---|
| Polyvinyl butyral (hydroxyl No. 144) | 100 |
| Di-(butoxyethyl) sebacate | 40 |
| Dibutylammonium oleate | 5 |
| Crown clay | 75 |
| Carbon black | 1 |
| Di-(methoxymethyl) urea | 9.4 |

The polyvinyl butyral, di-(butoxyethyl) sebacate, and dibutylammonium oleate are mixed together with 100 parts of denatured alcohol and allowed to stand for two hours. The mixture is then milled on a warm rubber mill (roll temperature 40–60° C.) until homogeneous and free of solvent. The Crown clay, carbon black, and di-(methoxymethyl) urea are each in turn milled into the composition. This composition is calendered into unsupported plastic sheeting between rolls heated at about 60° C. The sheeting is cured in an oven for two hours at 120° C. The cured plastic sheeting is not softened by boiling water or by heating at 200° C. Another sample of sheeting prepared in the same manner but containing no di-(methoxymethyl) urea became soft and lost its shape in boiling water. It marred at 60° C. in the mar point test.

*Example IV*

A coating composition is prepared from the following materials as is described below:

| | Parts |
|---|---|
| Polyvinyl butyral (hydroxyl No. 250) | 100 |
| Di-(butoxyethyl) sebacate | 50 |
| Crown clay | 75 |
| Carbon black | 1 |
| Di-(methoxymethyl) urea | 15 |

The polyvinyl butyral, di-(butoxyethyl) sebacate, are mixed together with 100 parts denatured ethyl alcohol and allowed to stand for at least two hours. The composition is then milled on a rubber mill with rolls heated at 40–60° C. while the Crown clay and carbon black are added. Milling is continued until the composition is substantially homogeneous. The mixture is then taken from the mill and dissolved in 500 parts of denatured ethyl alcohol containing 15 parts of di-(methoxymethyl) urea. This coating composition containing dissolved polyvinyl butyral and well dispersed pigment is applied to a sateen fabric by means of a doctor knife. The coated fabric is dried at 40–60° C. for 2–10 minutes following each coat. Enough coats are applied to deposit a film approximately 0.008" in thickness. Following the final coat, the coated fabric is dried for about 15 minutes at 65–70° C. and is then baked for 1.5 hours at 120° C. The coated fabric is pliable, tack free and is not softened by boiling water or by heating at 200° C.

As polyvinyl acetals most suitable for use in this invention may be mentioned the reaction products of hydrolyzed (or partially hydrolyzed) polyvinyl esters with the lower aliphatic, i. e. not more than 8 carbon atoms, aldehydes such as formaldehyde, acetaldehyde, propionaldehyde, and butyraldehyde. Polyvinyl ketals of hydrolyzed polyvinyl esters and ketones such as acetone or methyl ethyl ketone are also suitable. (In the claims the term "polyvinyl acetal" is used in its generic sense to include these polyvinyl acetals and ketals.) Since a considerable number of hydroxyl groups are required for curing, the polyvinyl acetals should have hydroxyl numbers of at least 60. The choice of polyvinyl acetal resins will of course depend upon the means used to form the article to be manufactured and the properties desired in the final article. Since milling, calendering, and extruding require that the composition be heated for a considerable time at a temperature at which it becomes plastic or workable, it is essential that no curing occur at temperatures required for these operations. Therefore, a polyvinyl acetal having a hydroxyl number between 60 and 275 is used for compositions which are to be formed in this manner. Polyvinyl acetals having hydroxyl numbers below 200 are preferred for these applications, since they show less tendency to cure during calendering or extruding. Those having hydroxyl numbers of 165 or less are particularly preferred since they show still less tendency to cure prematurely during forming. Polyvinyl acetals having hydroxyl numbers above 120 form articles which after curing are less thermoplastic and have better solvent resistance than those formed from polyvinyl acetals of lower hydroxyl number. The polyvinyl acetals which are especially preferred for calendering or extruding are, therefore, those having hydroxyl numbers between about 121 and 165. In molding, on the other hand, the plastic conforms quickly to the mold when heat and pressure are first applied. No harm is done, therefore, if some curing occurs during the latter stages of the molding cycle. Rapid curing is, in fact, usually desirable, since in this case long heating either in the mold or following the molding process, is then unnecessary. Consequently, it is possible to use polyvinyl acetals having considerably higher hydroxyl numbers for molding than can be successfully calendered or extruded. In the same way, when articles are formed or coatings are applied from solution, premature curing of the composition presents no problems. The use of a polyvinyl acetal having a high hydroxyl number may then prove desirable since the temperature and time required for curing is in this way reduced.

The amount of curing agent, that is, the dimethylol urea or dimethylol urea ethers, should be at least 1% of the weight of the polyvinyl acetal and should not exceed the weight of the polyvinyl acetal. Preferably, the amount of curing agent should be (on a solids basis) 3 to 40% of the weight of the polyvinyl acetal.

Ethers of dimethylol urea are well defined crystalline compounds having the following melting points.

| Compound | Melting Point |
|---|---|
| | °C. |
| Di(methoxymethyl)urea | 101 |
| Di(ethoxymethyl)urea | 124 |
| Di(n-propoxymethyl)urea | 95 |
| Di(n-butoxymethyl)urea | 93 |
| Di(n-amyloxymethyl)urea | 84 |
| Di(iso-propoxymethyl)urea | 113 |
| Di(iso-butoxymethyl)urea | 81–83 |
| Di(sec-butoxymethyl)urea | 117–120 |
| Di(n-decyloxymethyl)urea | 99–100 |
| Di(benzyloxymethyl)urea | 112 |

Dimethylol urea is more active as a curing agent than the ethers of dimethylol urea and is therefore most useful in compositions which are formed at low temperatures and are subsequently to be cured at low temperatures. The ethers of dimethylol urea require higher temperatures for curing and consequently are most useful when forming at relatively high temperatures such as by calendering or extruding is necessary.

Although the curing action takes place readily in the absence of a catalyst, it is sometimes desirable to have an acidic catalyst to reduce the temperature or time required for curing. Such materials as beta - phenyl - beta-bromopropionic acid, brom-naphthols, ammonium chloride, and phosphoric acid are suitable.

The plasticizers suitable for use in this invention are the ones which are commonly used with the polyvinyl acetal resins in the absence of the curing agent. For example, plasticizers suitable for use with polyvinyl acetal resins and particularly suitable for polyvinyl butyral include sebacates such as dibutyl sebacate, di-(methoxyethyl) sebacate, and di-(butoxyethyl) sebacate; phthalates such as di-(methoxyethyl) phthalate, di-(ethoxyethyl) phthalate, di - (butoxyethyl) phthalate, methyl phthalyl methyl glycolate, butyl phthalyl butyl glycolate, and the dialkyl phthalates of alcohols containing 8 or less carbon atoms; other esters such as di - (butoxyethoxyethyl) glutarate, butoxyethyl stearate, triethylene glycol di - (2 - ethyl butyrate), hydrogenated methyl abietate; oils such as castor oil, blown linseed oil, blown cottonseed oil, and blown corn oil; phosphates such as tricresyl phosphate, triphenyl phosphate, and tri-(tert.-butyl phenyl) phosphate; and chlorinated hydrocarbons such as chlorinated diphenyl. Unsaturated hydrocarbons described in U. S. 2,217,919 and known to the trade as Naftolen may also be used. Soft polymeric materials such as alkyd resins and factices are also suitable for use.

Materials suitable for use as pigments or fillers in the compositions of this invention include, in addition to color pigments, whiting, ground mica, clay, lithopone, barytes, zinc oxide, magnesium carbonate, magnesia, titanium oxide, carbon black, graphite, ground leather, and ground cellulosic materials. Graphite and carbon black are superior to other fillers listed for compositions which must be resistant to high temperature steam.

The method of compounding the composition may be varied both with the polymer used and with the equipment available. It is sometimes desirable in preparing compositions for calendering to swell the polyvinyl acetal present with a small amount of solvent in the presence of a plasticizer. Compounding and solvent removal can then be completed in a rubber mill or in an internal mixer of the Banbury or Werner & Pfleiderer type. The materials may also be compounded without solvent by mixing the powdered dry polymer with the plasticizer in a Werner & Pfleiderer mixer and subsequently colloiding by heating either in the same mixer or by passing through an internal screw-type mixer such as a Royle strainer. Pigments and the curing agent in this case may be added either during the initial mixing of the polymer and plasticizer, during the colloiding, or on a rubber mill after colloiding of the composition. In the preparation of coating compositions for coating from solution the pigments may be dispersed by milling with the polyvinyl butyral before the polyvinyl butyral is dissolved in solvent as described in Example IV, or they may be ground in the plasticizer and subsequently suspended in the solution of polyvinyl butyral.

The compositions of this invention may be applied as coating compositions to fabric, paper, wood, and metal by calendering, extruding, or coating from solution. They may also be calendered into unsupported sheeting, extruded as tubing or tape, or spun or cast from solution.

The formed articles can be cured by heating in a mold in an oven, or by contact with heated surfaces. Films or coated fabrics which are to be embossed may be cured in a press during the embossing treatment. In general, satisfactory curing occurs when the product is baked in an oven for 1–3 hours at temperatures of 125–105° C. (the longer time being used at the lower temperature). However, certain compositions, particularly those containing dimethylol urea or polyvinyl acetals of high hydroxyl content may cure at temperatures as low as 80° C. Higher temperatures up to 170° C. may be used with correspondingly shorter curing schedules. In many cases it is advantageous to postpone curing of the composition until further fabrication processes are completed. For example, when a coated fabric is used to manufacture raincoats or other articles requiring seaming the coated fabric is usually not cured until after the seams have been cemented. Solutions containing a polyvinyl acetal resin and dimethylol urea or an ether of dimethylol urea may be used as cements for cementing the seams. Cements adhere better to the uncured composition, and when a curable cement is used the coating and seams are all cured at once by baking the final product. In a similar way it is possible to make heat sealed seams with uncured coated fabric which can then be cured by baking the final article.

The compositions of this invention can be used for the manufacture of coated fabrics or unsupported sheeting to be used in the manufacture of raincoats, shower curtains, refrigerator bowl covers and bags, hot water bottles, hospital sheeting, baby carriage tops, baby bassinettes, upholstery, covers for footballs, basketballs, and other sporting goods, luggage, gaskets, dugout curtains, collapsible lifeboats and pontoons. Molded articles which can be prepared from these plastic compositions include heels and soles of shoes, balls, electrical insulation, stoppers, fruit jars, fruit jar rings, and gaskets. Solutions of these compositions are useful as adhesives for fabric, paper, wood particularly plywood, glass, metal, and particularly for articles composed of hydroxyl-containing resins.

It is apparent that many widely different embodiments of this invention may be made without departing from the spirit and scope thereof, and therefore, it is not intended to be limited except as indicated in the appended claims.

I claim:

1. The process of preparing non-thermoplastic and insoluble films which comprises milling at a temperature below 80° C. a polyvinyl acetal resin having a hydroxyl number from 121 to 165 with from 1% to an equal amount thereof of a lower alkyl ether of dimethylol urea calendering the mixture into a film and thereafter curing the film at a temperature between 80° C. and 125° C. to render it non-thermoplastic and insoluble.

2. The process of preparing non-thermoplastic and insoluble resins from polyvinyl acetal resins which comprises milling at a temperature between 40° C. and 80° C., a composition the essential film-forming ingredients of which consist of polyvinyl acetal resin having a hydroxyl number between about 121 to 165 with from 1% to an equal amount thereof of a lower alkyl ether of dimethylol urea until homogeneous, calendering the composition below the temperature at which there is appreciable reaction but above 40° C. and thereafter curing the same by subjecting it to a temperature of about from 105° C. to 125° C.

3. The process of claim 2 in which the polyvinyl acetal resin is polyvinyl butyral.

4. The process of claim 2 in which the curing includes heating the calendered article from 1 to 3 hours.

5. The process of claim 2 in which the composition is calendered onto a fabric.

6. The process of claim 2 in which the lower alkyl ether of dimethylol urea is present in amount between about 3% and 40% of the polyvinyl acetal resin.

GORDON T. VAALA.

REFERENCES CITED

The following references are of record in the file of this patent:

UNITED STATES PATENTS

| Number | Name | Date |
| --- | --- | --- |
| Re. 20,439 | Morrison et al. | June 29, 1937 |
| 2,162,678 | Robertson | June 13, 1939 |
| 2,169,250 | Izard | Aug. 15, 1939 |
| 2,243,560 | Hall et al. | May 27, 1941 |
| 2,268,121 | Kingsley | Dec. 30, 1941 |
| 2,275,008 | Coffman | Mar. 3, 1942 |
| 2,277,083 | Dorough | Mar. 24, 1942 |
| 2,279,745 | Stevenson | Apr. 14, 1942 |
| 2,284,896 | Hanford et al. | June 2, 1942 |
| 2,317,131 | Conaway | Apr. 20, 1943 |
| 2,396,098 | Hass | Mar. 5, 1946 |
| 2,423,565 | Rodman | July 8, 1947 |
| 2,432,242 | Leekley | Dec. 9, 1947 |

OTHER REFERENCES

Ellis, Chem. of Synthetic Resins, Reinhold Publishing Co., 1935.

Du Pont Technical Data Bulletin No. 2—12—42 issued by Electro-Chem. Dept., Du Pont Co., Wilmington, Del., 3 page pamphlet.